No. 871,061. PATENTED NOV. 12, 1907.
J. J. FORD, F. HOLLISTER & M. HOLLISTER, JR.
DRAFT EQUALIZER.
APPLICATION FILED JUNE 18, 1906.
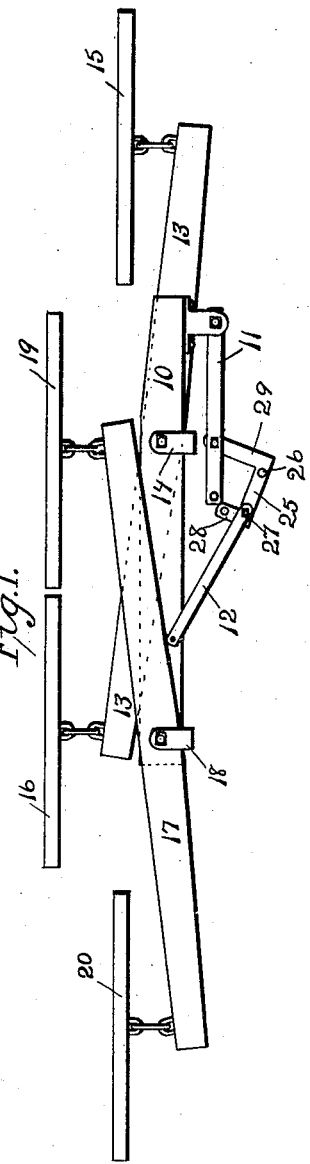
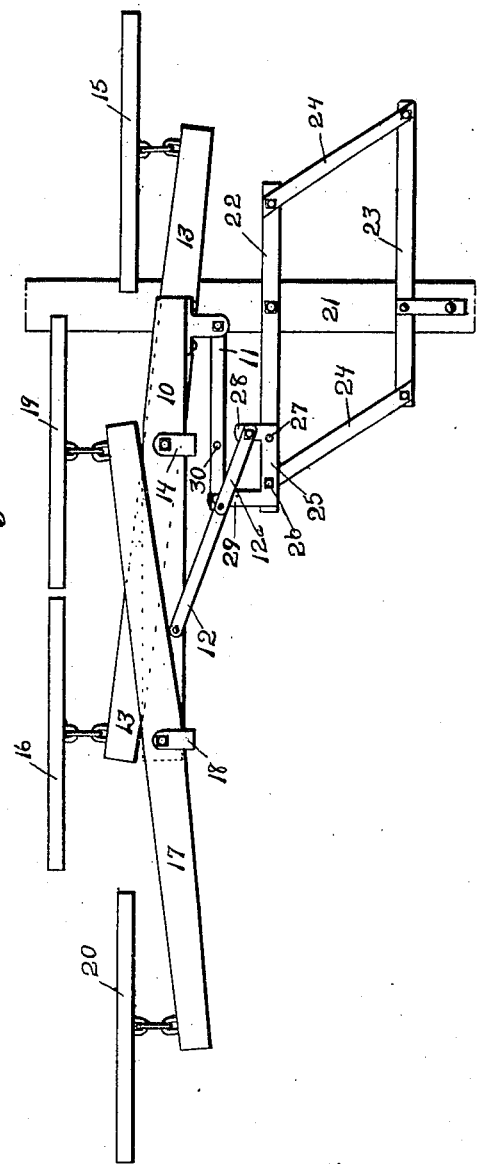
Witnesses:
A. E. Woody.
S. F. Christy.
Inventors:
James J. Ford,
Fred Hollister,
Mark Hollister Jr.
By Orwig & Lane Atty's

UNITED STATES PATENT OFFICE.

JAMES J. FORD, FRED HOLLISTER, AND MARK HOLLISTER, JR., OF FORT DODGE, IOWA.

DRAFT-EQUALIZER.

No. 871,061.  Specification of Letters Patent.  Patented Nov. 12, 1907.

Application filed June 18, 1906. Serial No. 322,632.

*To all whom it may concern:*

Be it known that we, JAMES J. FORD, FRED HOLLISTER, and MARK HOLLISTER, Jr., citizens of the United States, residing at Fort Dodge, in the county of Webster and State of Iowa, have invented a certain new and useful Draft-Equalizer, of which the following is a specification.

The objects of our invention are to provide a draft equalizer of simple, durable and inexpensive construction especially designed for use in connection with four draft animals and in which the draft center is thrown to one side of the center of the line of advance of the draft animals so that three of the draft animals may advance on one side of the center of the line of advance and one draft animal on the other side and also to provide a draft equalizer of this class in which the side draft upon the article to which the draft equalizer is attached is minimized.

Our invention consists in certain details in the construction, arrangement and combination of the various parts of the device, whereby the objects contemplated are attained, as hereinafter more fully set forth, pointed out in our claims and illustrated in the accompanying drawings, in which—

Figure 1 shows a top or plan view of the complete device embodying our invention, and Fig. 2 shows a similar view illustrating the device applied to a vehicle tongue.

Referring to the accompanying drawings, the reference numeral 10 is used to indicate the evener bar which is of relatively short length. Pivoted to one end of the evener bar is a link 11 projected toward the center of the evener bar. Pivoted a short distance from the other end of the evener bar is a link 12 projected rearwardly and toward the center of the evener bar and provided with the extension link 12ª pivoted thereto. The reference numeral 13 indicates one of the double-trees which is of relatively great length and which is pivoted at its center by the strap 14 to the evener bar 10 at a point about one-third the distance between the forward end of the link 11 and the forward end of the link 12. Swingle trees 15 and 16 are connected with the opposite ends thereof. The numeral 17 indicates the second double-tree pivoted at its center by means of the strap 18 to the end of the evener bar beyond the point where the link 12 is attached. On one end of the double-tree 17 is a swingle tree 19 which stands between the swingle trees 15 and 16 and on its other end is a swingle-tree 20. By this arrangement it is obvious that the two draft animals on one side are not attached to the same double-tree, but the first and third draft animals from either side are connected to the same double-tree.

Two of the draft animals are attached to the double-tree 17 which is pivoted to the evener bar 10 near one end and the remaining two draft animals are connected to the evener bar at a point some distance from the other end thereof, so that there would be a tendency for the end of the evener bar to which the double-tree 17 is attached to move forwardly in advance of the other end. This tendency, however, is counteracted as will hereinafter appear.

We have arranged the draft equalizer to be used either in connection with a vehicle tongue, or for attachment to a device not having a tongue.

In Fig. 2 of the drawings, the reference numeral 21 indicates a vehicle tongue having attached to it two bars 22 and 23 parallel with each other and at right angles to the tongue. These bars are braced and connected by means of the brace rods 24. One end of the forward bar 22 is designed to receive and support the equalizing lever. This lever comprises a body portion 25 pivoted at one end by means of the bolt 26 to the bar 22. Near its other end is an opening 27, for purposes hereinafter made clear. At right angles to the body 25 and adjacent to the opening 27 is a forwardly projecting arm 28 to which the link 12ª is pivoted, and on the other end of the body portion 25 is a forwardly projecting arm 29 to which the link 11 is pivoted. This link 11 is provided with an opening 30, for purposes hereinafter made clear. By providing one short arm 28 and one long arm 29 on the equalizing lever, and by arranging the links 11 and 12, as shown, it is obvious that it will require a relatively long forward movement of the right end of the evener bar 10 to move the link 12 rearwardly a given distance and a relatively short forward movement of the left end of the evener bar 10 will move the link 11 rearwardly a relatively long distance, and since the link 11 is attached to the end of the bar 10 and the link 12 is attached some distance from the other end thereof, the equalizing lever 25 will accurately balance the draft between the double-trees 13 and 17. If it is desired to use the device without a vehicle tongue, then the operator removes the equalizing lever 25 and removes the link 12ª. He then attaches the end of the link to the opening 27 of the equalizing lever and he attaches the arm 29 of the equalizing lever to the opening 30 in the link 11, as clearly shown in Fig. 1. In this way the link 11 is still held in its position substantially parallel with the evener bar 10 and the draft is equalized in substantially the same way as before described.

Having thus described our invention, what we claim and desire to secure by Letters Patent of the United States, therefor is—

1. In a draft equalizer, the combination of an evener bar, links pivoted to the ends thereof and extended toward the center thereof and rearwardly, one of said links being spaced apart from and to which it is attached, a lever pivoted to said links, a double-tree pivoted to the evener bar at a point spaced apart from one end of the evener bar and a second double-tree pivoted to the other end portion of the evener bar at a point outside of the point where the link is attached to the evener bar a short distance from its end, the inner end of each double-tree standing at about the center of the other double-tree.

2. The combination of a relatively short evener bar, a link pivoted near one end thereof, and extended rearwardly and toward the center of the evener bar, a second link pivoted a short distance from the other end of said evener bar, and extended rearwardly and toward the center of the evener bar, a lever pivoted to the rear ends of said links, a double-tree pivoted to the evener bar at a point between its center and the inner end of the evener bar, a second double-tree pivoted to the evener bar, near its other end, at a point outside of the point where the link is pivoted, said double-trees so arranged that the inner end of each stands at about the center of the other.

3. In a draft equalizer, the combination of an evener bar, a double-tree pivoted near one end of the evener bar, a second double-tree pivoted near the other end of the evener bar, the inner end of each of said double-trees standing at about the center of the other double-tree, a link pivoted to one end of the evener bar and extended toward the center thereof, substantially parallel therewith and provided with an opening between its ends, a link pivoted near the other end of the evener bar, extended rearwardly and toward the center of the evener bar, a link section pivotally and detachably connected with the rear end thereof, an equalizing lever having a body portion substantially parallel with the evener bar and having a long arm extended forwardly therefrom and pivotally and detachably connected with the first mentioned link, and also having an arm on its other end extended forwardly, and pivotally and detachably connected with the said link section, said body portion formed with an opening near the point where the said link section is attached to it, and a cross bar designed to be attached to a vehicle tongue and supported at right angles thereto, said cross bar pivotally connected with said equalizing lever at a point adjacent to the long arm thereof.

JAMES J. FORD.
FRED HOLLISTER.
MARK HOLLISTER, Jr.

Witnesses:
M. F. HEALY,
D. M. KELLEHER.